United States Patent
Li (10) Patent No.: US 10,164,904 B2
(45) Date of Patent: Dec. 25, 2018

(54) NETWORK BANDWIDTH SHARING IN A DISTRIBUTED COMPUTING SYSTEM

(71) Applicant: Facebook, Inc., Menlo Park, CA (US)

(72) Inventor: Jian Li, Pleasanton, CA (US)

(73) Assignee: Facebook, Inc., Menlo Park, CA (US)

( * ) Notice: Subject to any disclaimer, the term of this patent is extended or adjusted under 35 U.S.C. 154(b) by 267 days.

(21) Appl. No.: 15/146,371

(22) Filed: May 4, 2016

(65) Prior Publication Data
US 2017/0324678 A1 Nov. 9, 2017

(51) Int. Cl.
*H04L 12/911* (2013.01)
*H04L 29/08* (2006.01)

(52) U.S. Cl.
CPC .......... *H04L 47/827* (2013.01); *H04L 47/821* (2013.01); *H04L 67/10* (2013.01); *H04L 67/1095* (2013.01); *H04L 67/1097* (2013.01)

(58) Field of Classification Search
CPC ............ G06F 11/2035; G06F 11/2097; G06F 17/30584; G06F 17/30607; G06F 9/45533; G06F 9/45558; G06F 9/4856; G06Q 10/06; H04L 25/14; H04L 45/00; H04L 67/1095; H04L 47/827; H04L 47/821; H04L 67/1097; H04L 67/10
See application file for complete search history.

(56) References Cited

U.S. PATENT DOCUMENTS

| | | | | |
|---|---|---|---|---|
| 2003/0058277 A1* | 3/2003 | Bowman-Amuah | | G06F 17/30607 715/765 |
| 2006/0059253 A1* | 3/2006 | Goodman | ............. | G06Q 10/06 709/223 |
| 2008/0008202 A1* | 1/2008 | Terrell | ..................... | H04L 45/00 370/401 |
| 2009/0257386 A1* | 10/2009 | Achir | ..................... | H04L 25/14 370/329 |
| 2009/0276771 A1* | 11/2009 | Nickolov | .............. | G06F 9/4856 717/177 |
| 2011/0061046 A1* | 3/2011 | Phillips | ............... | G06F 9/45533 717/176 |
| 2015/0264135 A1* | 9/2015 | Kandula | ............. | H04L 67/1095 709/204 |
| 2015/0269239 A1* | 9/2015 | Swift | ................ | G06F 17/30584 707/610 |
| 2015/0363124 A1* | 12/2015 | Rath | ................... | G06F 11/2097 709/219 |
| 2016/0026535 A1* | 1/2016 | Bhat | .................. | G06F 11/2035 714/19 |
| 2018/0024854 A1* | 1/2018 | Wang | ................. | G06F 9/45558 |

* cited by examiner

*Primary Examiner* — Le H Luu (74) *Attorney, Agent, or Firm* — FisherBroyles, LLP (57) ABSTRACT

A bandwidth sharing system is provided that has worker nodes with executor threads for copying data from source nodes to destination nodes based on assigned copy jobs. To execute its assigned copy job, a worker thread of a worker node registers its copy job with the source node. The source node allocates a portion of its bandwidth to the copy job. The source node sends the data of the copy job to the worker thread, and the worker thread forwards the data to the destination node. Upon completion of the copy job, the worker thread deregisters the copy job. The deregistration allows the source node to reallocate the portion of its bandwidth that was allocated to the copy job to another copy job.

20 Claims, 8 Drawing Sheets

NETWORK BANDWIDTH SHARING IN A DISTRIBUTED COMPUTING SYSTEM

BACKGROUND

With the growing popularity of "cloud computing," the number of computers needed to support cloud computing is increasing rapidly. A provider of a cloud infrastructure ("a cloud provider) typically organizes the computers into geographically distributed data centers that can each have thousands of computers. The data centers are distributed for various reasons. One reason is to reduce response time to clients by having clients connect to the closest data center. For example, clients in Europe may connect to a data center located in Europe, and clients in North America may connect to a data center in the United States. Another reason is to provide a backup in case of disaster. For example, if the data center in Europe was down because of a natural disaster, the clients in Europe could be connected to the data center in the United States. Although the response time may be somewhat slower because of the distance and because of the increased load on the data center in the United State, the clients can still have useful work done.

Because the data centers are geographically distributed, large amounts of data may need to be transferred between datacenters. For example, data of a data center may need to be periodically backed up to another data center. If the data center was to go down, then the other data center would have a current or near-current copy of the data. Although it may take longer to access the backed up data, it is still accessible. As another example, as the amount of stored data of a data center nears the storage capacity of the data center, certain stored data may need to be moved to another data center that has more storage capacity.

The amount of data that is moved between data centers can be well into the petabytes and approach an exabyte. The speed of moving of such large amounts of data between data centers is limited by the wide-area network ("WAN") that connects the data centers. As a result, the movement of high-priority data (or high-priority traffic) can be delayed because of the movement of large amounts of relatively low-priority data (e.g., a large database that is being backed up). Because a data center can have tens of thousands of computers used by thousands of customers, it can be difficult to predict how much data the computers will attempt to move between the data centers at any given time. Many of the computers of different customers may attempt to move large amounts of data from one data center to another data center at the same time. As a result, the data center may not be able to provide the agreed-upon level of service to each customer. To help ensure that certain data movement traffic is not squeezed out by another data movement traffic or that customers receive the agreed-upon level of service, some cloud providers may dedicate certain amounts of bandwidth to different types of traffic. For example, a cloud provider may dedicate 70% of the bandwidth to one type of traffic and 30% to another type of traffic. Because of the unpredictable nature of data movement by customers and to some extent by the data center itself, a cloud provider may not always be able to provide the agreed-upon level of service to its customers.

DETAILED DESCRIPTION

A bandwidth sharing system is provided that allocates network bandwidth to multiple copy jobs executing that copy data from multiple source data nodes to multiple destination data nodes in a distributed computing system. The bandwidth sharing system includes a data copier that executes the multiple copy jobs and a global traffic manager node that co-ordinates with the data copier to allocate bandwidth to the copy jobs. A copy job consists a list of files to be copied from a source data center to a destination data center. The files can be on one data node or distributed across multiple data nodes of the source data center. In fact, a single file can be distributed across multiple data nodes in the source data center. Similarly, the copy job can copy the list of files to one data node, or copy different files from the list of files or even different portions of the same file to different data nodes in the destination data center. A data copier has a number of worker nodes that can execute multiple copy jobs. A worker node can employ multiple threads (referred to as "executors" or "executor threads") for executing multiple copy jobs or different portions of the same copy job, e.g., a subset of the list of files to copied by the copy job.

When a copy job is to be executed, a worker node employs one or more executors to perform the copy job. Consider that a worker node employs different executors to copy different data blocks of a particular file from the source data center to the destination datacenter. A first executor contacts a first data node in the source datacenter that has a first data block of the particular file and registers with the first data node to copy the first data block. A registration can include an identifying information of the copy job, e.g., an Internet Protocol (IP) address of the worker node which has employed the first executor and a port number of the first executor. Upon completion of the first block, the executor deregisters with the first source node. The deregistration allows the connection between the first data node and the worker node to be used for potentially other copy jobs. Similarly, other executors register with the respective source data nodes prior to copying the data block and deregister upon completion of the copying. A particular data node has a registry, which includes registrations of various copy jobs that are copying data from the particular data node. In some embodiments, the bandwidth sharing system includes a global traffic manager node, e.g., a centralized traffic coordinator, that allocates bandwidth to different types of the copy jobs executing in the distributed computing system based on a service level agreement (SLA) associated with a type of the copy job, which is determined based on the type of data being copied by the copy job, actual usage of bandwidth by the copy jobs executing at each of the source nodes, and a number of registrations at each of the source nodes. The bandwidth allocation for job types are then sent to each of the source nodes. A particular source node can then implement traffic shaping to control the amount of bandwidth to be allocated to each of the copy jobs executing on the particular source node based on the received bandwidth.

Some example types of data exchanged between datacenters include—"imports" in which data from a first datacenter is imported by a second datacenter for use with data associated with the second datacenter, and "namespace moves," in which a section of the data from the first datacenter is moved to the second datacenter for various reasons, e.g., the first datacenter is running out of space and cannot accommodate the fast growing section of data. Another example type of data includes "scribe" data, which is copied from one datacenter to another datacenter more often than the other types of data, and the amount of delay that can be tolerated in copying such data is typically lower than that can be tolerated with the other type of data. Accordingly, the global traffic manager node can allocate more bandwidth to such type of copy jobs compared to the others. A user, e.g., an administrator, can specify various bandwidth rules for allocating bandwidth to different types of copy jobs.

For example, a bandwidth rule may indicate that a specified type of copy job is assured a certain percentage of the bandwidth of the network, such as 10% of the bandwidth. Another bandwidth rule may indicate that a specified type of copy job is assured a certain data transmission rate (e.g., 4 gigabytes per minute). Still another bandwidth rule may indicate that a specified type of copy job is not assured any bandwidth (e.g., for a very low priority copy job). In another example, the bandwidth rule may indicate the source node to allocate bandwidth based on the type of the copy job or the data being copied. The global traffic manager node allocates the bandwidth to different types of copy jobs based on the SLA, actual bandwidth usage by each copy job and/or data type and a list of registrations at each source node, and sends the bandwidth allocation for different types of copy jobs to each of the source nodes. Each of the source nodes can then, based on the received bandwidth allocation, allocate portions of the bandwidth of the source node to different copy jobs executing at the corresponding source node.

The source node may employ various techniques to allocate its bandwidth to its copy jobs. For example, the source node may give absolute priority to copy jobs with assured percentages, which may result in no data being copied for copy jobs with no assured bandwidth. Alternatively, the source node may allocate some percentage of its bandwidth (e.g., 10%) to be allocated to copy jobs with no assured bandwidth so they will not be totally squeezed out. The source node may also factor in the bandwidth rule for and the amount of data to be copied by each copy job in determining how much bandwidth to allocate or deallocate to a particular copy job. For example, a source node of a high-priority copy job with an assured percentage of 70% may need more bandwidth allocated so that the copy job can be completed in time to satisfy a service agreement with a customer.

In some embodiments, the data copier may receive copy job requests from various nodes of the data center. For example, a compute node (e.g., a server allocated to a customer) may generate a copy job request based on an administrator requesting that a copy job be performed. The administrator may be reconfiguring a database and may request a copy job to back up the database before the start of the reconfiguration. As another example, a data node may be configured to generate a copy job to back up certain file on a periodic basis. As another example, a data node may be configured to generate a copy job to move at least a portion of a namespace to another data center when the namespace reaches a certain size.

The worker nodes can be distributed across locations. For example, some worker nodes can be in a first data center, some in a second data center and some in a third datacenter. Furthermore, some of the data nodes can also act as worker nodes. In some embodiments, the worker node of a copy job may be part of the same data center as the source node, part of the same data center as the destination node, or part of a data center different from that of the source node or the destination node. If part of the same data center as the source node, the worker node can be executing on the same data node as the source node or a different data node from the source node. Similarly, if part of the same data center as the destination node, the worker node can be executing on the same data node as the destination node or a different data node from the destination node. In some embodiments, a data movement broker node can select the worker node to which a copy job has to be allocated based on a specified criterion, e.g., a worker node that is in the same cluster as the source node or the destination. The bandwidth sharing system thus allows various data nodes to function as worker nodes based on changing needs of the data center. The worker nodes may also be organized into clusters that handle certain types of copy operations. For example, one cluster can handle high-priority copy jobs, and another cluster can handle low-priority copy jobs.

Figure 1:
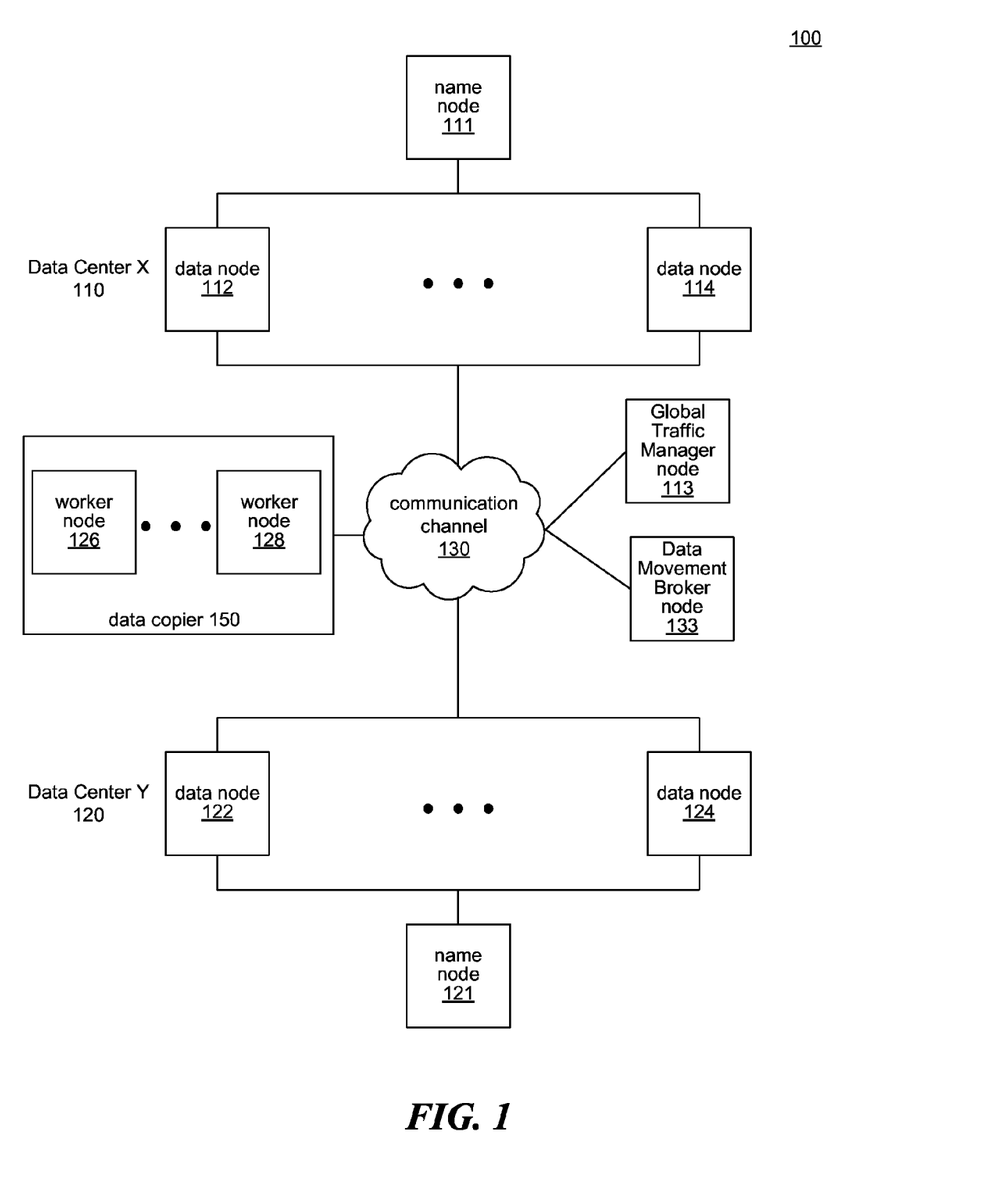
FIG. 1 is a block diagram of an environment 100 in which the disclosed bandwidth sharing system can be implemented.

FIG. 1 is a block diagram of an environment 100 in which the disclosed bandwidth sharing system can be implemented. A data center 110 is connected to a data center 120 via a communication channel 130. Data center 110 includes a number of computing devices, of which at least one computing device is configured as a name node 111, one or more computing devices are configured as data nodes, e.g., data nodes 112-114, that store data. In some embodiments, the data nodes 112-114 store data as blocks in which a block of data is the smallest unit of data that can be accessed. The name node 111 and data nodes 112-114 may be part of a distributed file system, e.g., Hadoop Distributed File System. The name node 111 provides metadata for data stored by the data nodes 112. The name node 111 manages the file system for the data stored at the data nodes 112. A user or an application can create directories and store files inside these directories. The name node 111 can maintain the file system namespace. A data center 120 similarly includes a name node 121 and data nodes 122-124.

The environment 100 also includes a data copier 150 for executing the copy jobs. The data copier 150 can include one or more worker nodes, e.g., worker nodes 126-128. As described above, the worker nodes can be distributed in the environment 100, e.g., some of them can be in data center 110, some in data center 120, some in another data center, or all can be in a particular data center. In some embodiments, a data node in a data center can be configured as a worker node as well. For example, if the data center 110 has a specified number of data nodes 112-114, a worker node process can be executed at one or more of the specified number of the data nodes 112-114 to configure the data nodes as worker nodes. The environment 100 also includes a data movement broker node 133 that allocates the copy jobs to the worker nodes 126-128. As described above, the global traffic manager node 113 controls the allocation of bandwidth to different types of the copy jobs executed by the worker nodes.

Figure 2:
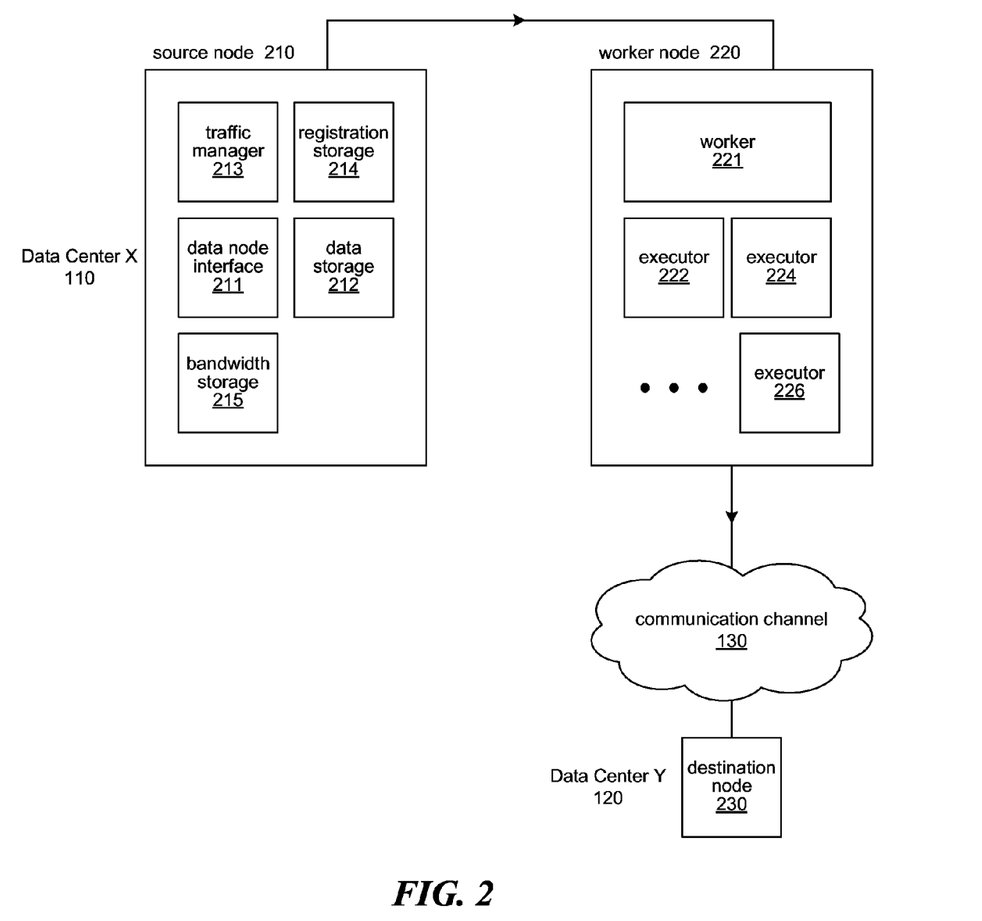
FIG. 2 is a block diagram that illustrates components of source nodes and worker nodes of the bandwidth sharing system in some embodiments.

FIG. 2 is a block diagram that illustrates components of source nodes and worker nodes of the bandwidth sharing system in some embodiments. Data center 110 includes source node 210 and worker node 220. The source node 210 is one of the data nodes 112-114 of the data center 110 from which the data is to be copied. The destination node 230 is one of the data nodes 122-124 of the data center 120 to which the data is to be copied. As described above, the worker node 220 can be executing on the same data node of the data center 110, which is also the source node 210, or on different data node. In some embodiments, a data node of the datacenter can be configured as the worker node by 220 by executing a worker process 221 on the data node. Similarly, in some embodiments, the worker node 220 can be in the data center 120 of the destination node 230, and can be executing on the same data node of the data center 120, which is also the destination node 230, or on different data node. In yet another embodiment, the worker node 220 can be in a data center other than data centers 110 and 120.

The worker process 221 is a multi-threaded process, which enables the worker node 220 to generate multiple executors, e.g., executors 222-226, each of which is a thread, for performing multiple copy jobs. Each executor can be executing at a different port number. As described above, the executors can be used for executing different copy jobs or different portions of a single copy job. The worker node 220 is connected to the destination node 230 of data center 120 via communication channel 130. The source node 210 includes a data node interface component 211, a data storage 212, a traffic manager component 213, a registration storage 214 and a bandwidth storage 215. The data node interface component 211 provides an interface for clients to access data of a data node. The traffic manager component 213 controls the allocation of bandwidth to copy jobs executing at the source node 210, e.g., based on bandwidth allocated by the global traffic manager node 113 to the different types of copy jobs being executed in the entire distributed computing system. In some embodiments, the bandwidth rules for allocating bandwidth to different types of data are input by a user, e.g., an administrator. The bandwidth rules can be determined based at least in part on a service agreement with a client for whom the bandwidth sharing system is implemented. The data storage 212 stores the data of the data node. The registration storage 214 stores information on registered copy jobs. The bandwidth storage 215 stores bandwidth allocation information received from the global traffic manger node 213 that describes bandwidth allocated to each type of copy job, e.g., bandwidth limits for each type of copy job. As illustrated by the arrows, the data moves from the source node to the worker node and from the worker node through the communications channel to the destination node. The communication channel 130 may be a wide area network of a cloud provider.

The nodes on which the bandwidth sharing system may be implemented using computers that include a central processing unit, input devices, output devices (e.g., display devices and speakers), storage devices (e.g., memory and disk drives), network interfaces, graphics processing units, and so on. The input devices may include keyboards, pointing devices, touch screens, gesture recognition devices (e.g., for air gestures), head and eye tracking devices, microphones for voice recognition, and so on. The computer systems may access computer-readable media that include computer-readable storage media and data transmission media. The storage media, including computer-readable storage media, are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the bandwidth sharing system. The data transmission media are used for transmitting data via transitory, propagating signals or carrier waves (e.g., electromagnetism) via a wired or wireless connection. The computers may include a secure cryptoprocessor as part of a central processing unit for generating and securely storing keys and for encrypting and decrypting data using the keys.

The bandwidth sharing system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the bandwidth sharing system may be implemented in hardware using, for example, an application-specific integrated circuit (ASIC).

Figure 3:
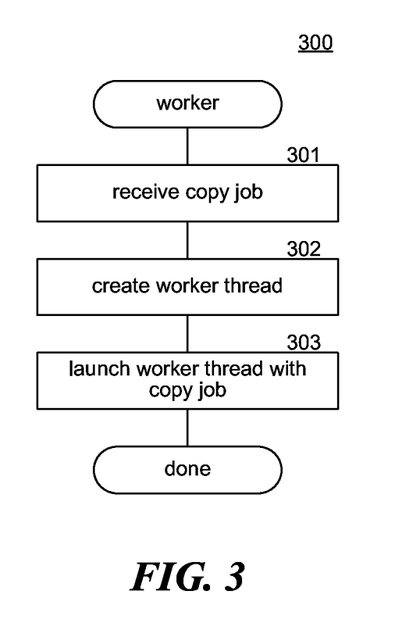
FIG. 3 is a flow diagram that illustrates processing of a worker component of a worker node in some embodiments.

FIG. 3 is a flow diagram that illustrates a process 300 allocating copy jobs to a worker node in some embodiments. In some embodiments, the process 300 can be executed in environment 100 of FIG. 1. A worker node, e.g., worker node 220, receives copy jobs from the data movement broker node 133 and launches worker threads to execute the copy jobs. In block 301, the worker node 220 receives a copy job from the data movement broker node 133. In block 302, the worker node 220 creates one or more executors, e.g., executors 222-226, for the copy job. In block 303, the worker node 220 launches the executor with the information of the copy job. In some embodiments, the information of the copy job includes file identifying information such as name of the file, file identifier (ID), a source location of the file, e.g., a specified data center, and a destination location of the file. The copy job can include such information for multiple files. The files can be spread across different data nodes in the specified data center. The copy job may obtain the identifying information regarding those data nodes by the name node of the specified data center. In some embodiments, different data blocks of a single file can be stored at different data nodes, and the copy job can obtain identifying information regarding those data nodes by the name node of the specified data center.

Figure 4:
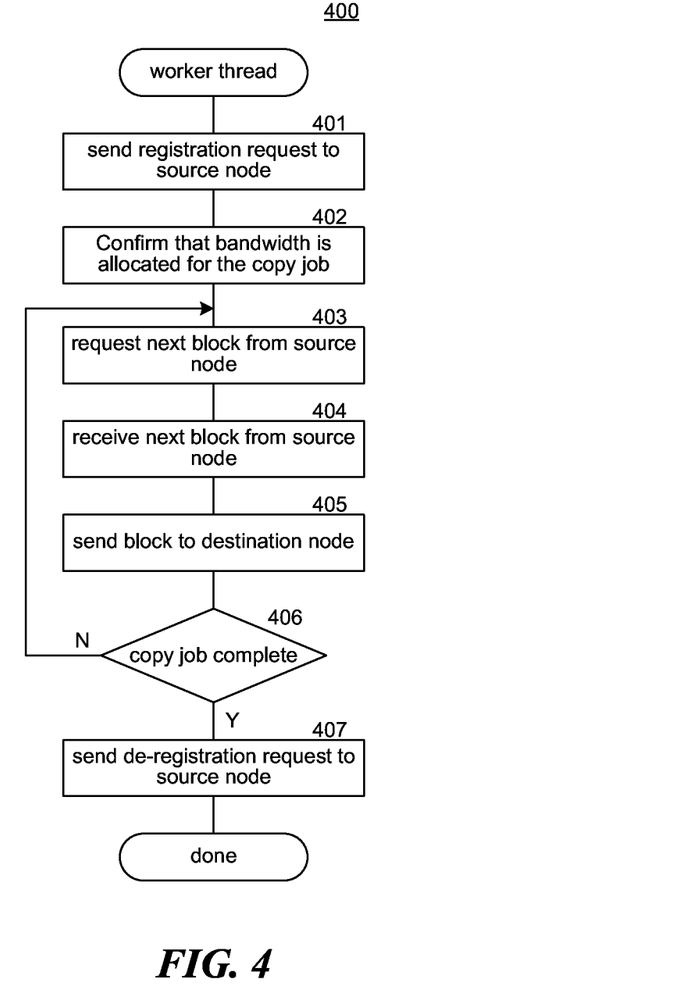
FIG. 4 is a flow diagram of a process for executing a copy job by an executor in some embodiments.

FIG. 4 is a flow diagram of a process 400 for executing a copy job by an executor in some embodiments. An executor, e.g., executor 222, may be passed a copy job that specifies a source node, e.g., source node 210, a destination node, e.g., destination node 230, and data to be copied. In block 401, the executor 222 sends a registration request to the source node 210 from which the data is to be copied. For example, the registration request can include an IP address of the worker node 220 on which the executor 222 to which the copy job is allocated is executing and a port number at which the executor 222 is executing. In block 402, the source node 210 confirms that the traffic manager component 213 allocated bandwidth to execute the copy job. In some embodiments, the executor 222 executes blocks 403-

407 only if the bandwidth is allocated for the copy job, else the executor 222 can wait until the bandwidth is allocated for the copy job.

In the blocks 403-406, the executor 222 loops processing each copy request of the copy job. In block 403, the executor 222 requests the next block of data from the source node 210. In block 404, the executor 222 receives next block of data from the source node 210. In block 405, the executor 222 sends the block to the destination node 230 via the communication channel. In block 406, if the copy job is now completed, then the executor 222 continues at block 407, else the executor 222 loops to block 403 to select to next block of data from the source node. In block 407, the executor 222 deregisters the copy job from the source node and completes.

Figure 5:
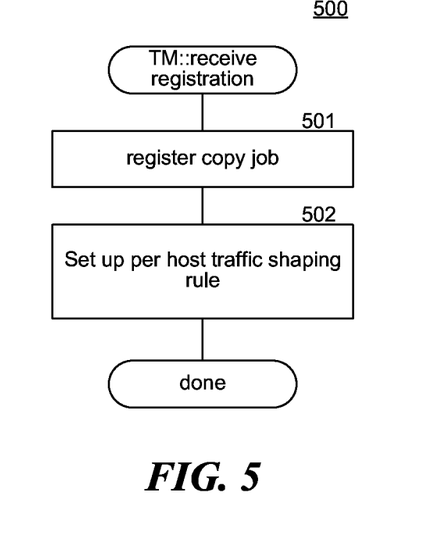
FIG. 5 is a flow diagram of a process of registering a request from an executor at a source node for executing a copy job at the source node in some embodiments.

FIG. 5 is a flow diagram of a process 500 of registering a request from an executor at a source node for executing a copy job at the source node in some embodiments. In some embodiments, the process 500 can be executed as part of block 401 of process 400. A data node interface, e.g., data node interface component 211, facilitates registration of a copy job. In block 501, the data node interface component 211 stores indication of the identification of the executor 222 such as the IP address and port number assigned to the executor 222. In some embodiments, the registration request can also indicate a type of the copy job so that the traffic manager component 213 can prioritize and/or allocate the bandwidth to the copy job accordingly. In block 502, in response to receiving the registration request, the traffic manager component 213 generates and/or modifies a per host traffic shaping rule to allocate bandwidth for each of the copy jobs executing at the source node 210. The traffic shaping rules allocate bandwidth to each of the copy jobs executing at the source node 210 based on bandwidth allocation provide by the global traffic manager node 113 for each of the multiple copy job types executing in the distributed computing system.

In some embodiments, the global traffic manager node 113 sends bandwidth allocations for different copy job types. For example, the global traffic manager node 113 can assign x % of the bandwidth to a first data type, y % of the bandwidth to a second data type. When the source nodes receive the bandwidth allocation for different job types, the traffic manager at each of the source nodes can allocate portions of the allocated bandwidth to different copy jobs executing at the corresponding source node. For example, if a source node has three copy jobs in which two are of first type, e.g., copying data of first type, and one is of a second type, the traffic manager at the source node allocates x % of bandwidth available at the source node to the copy jobs of the first type and y % of the bandwidth available at the source node to the copy job of the second type.

In some embodiments, the per host traffic shaping rule is updated whenever a copy job registers and/or deregisters so that the bandwidth can be distributed to the existing copy jobs and/or new copy jobs to be received at the source node 210 accordingly. In some embodiments, a number of copy jobs can be copying data from the source node 210 and therefore, the source node 210 may have to allocate the bandwidth for each of the copy jobs accordingly. The source node 210 can determine the various copy jobs that are registered for the source node 210 based on the registration requests.

In some embodiments, traffic shaping can result in one or more of allocating a specified bandwidth to the specified copy job, adjusting the allocated bandwidth of another copy job for allocating the bandwidth to the specified copy, or adjusting a data transfer rate of the other copy job.

Figure 6:
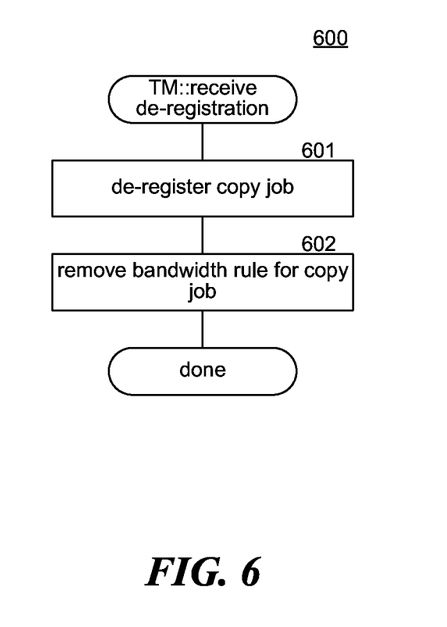
FIG. 6 is a flow diagram of a process of deregistering a copy job at the source node in some embodiments.

FIG. 6 is a flow diagram of a process 600 of deregistering a copy job at the source node in some embodiments. In some embodiments, the process 600 can be executed as part of block 407 of process 400. A data node interface, e.g., data node interface component 211, facilitates deregistration of the copy job. The data node interface component 211 receives deregistration request from an executor, e.g., executor 222, after the executor 222 completes copying the file or the block from the source node 210. In block 601, the source node 210 deregisters the copy job by removing identification of the executor 222 from the registration storage 214. In block 602, the traffic manager component 213 removes the bandwidth rule for the copy job, e.g., updates the traffic shaping rule to reallocate the bandwidth that was used by the deregistered job to another copy job, which can be an existing copy job or a new copy job. The deregistration can also indicate that the executor 222 can now be used to execute other copy jobs.

Figure 7:
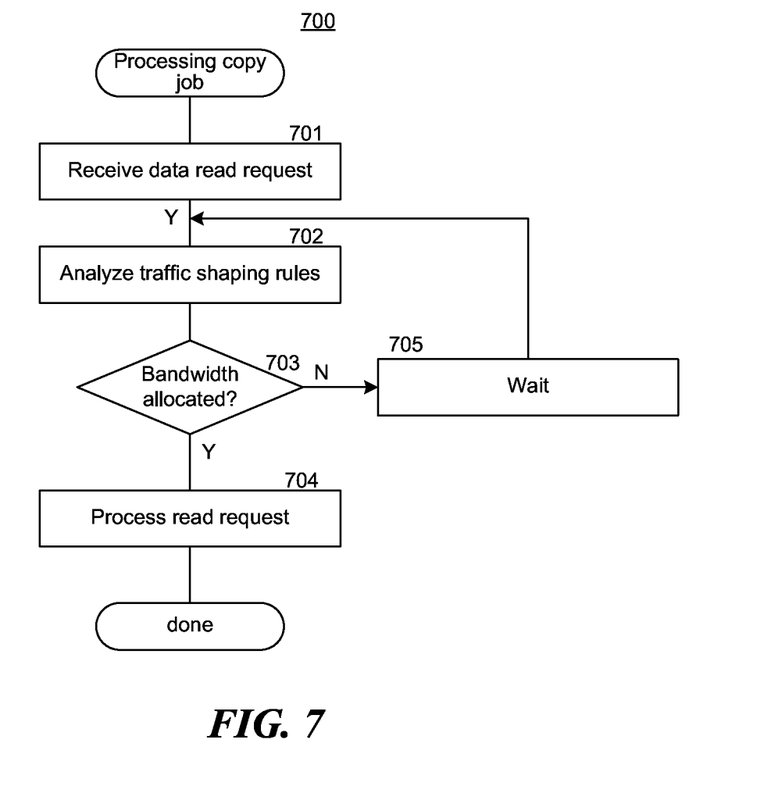
FIG. 7 is a flow diagram of a process for executing a copy job at a source node in some embodiments.

FIG. 7 is a flow diagram of a process 700 for executing a copy job at a source node in some embodiments. In some embodiments, the process 700 can be executed as part of block 402 of process 400. A data node interface, e.g., data node interface component 211, can facilitate execution of a copy job at a source node, e.g., source node 210. In this example, the copy job is for copying data of a first type from the source node 210 to destination node 230. In block 701, the data node interface component 211 receives a data read request from the copy job. In block 702, the data node interface component 211 analyzes the traffic shaping rules set by the traffic manager component 213 to determine if the traffic manager component 213 has allocated bandwidth to the copy job.

In decision block 703, if the data node interface component 211 determines that the traffic manager component 213 has allocated bandwidth to the copy job, at block 704, the data node interface component 211 processes the copy job, e.g., allows the copy job to read the data to be copied from the source node 210. On the other hand, if the data node interface component 211 determines that the traffic manager component 213 has not allocated bandwidth to the copy job, at block 705, the data node interface component 211 indicates the copy job to wait until bandwidth is allocated to the copy job.

Figure 8:
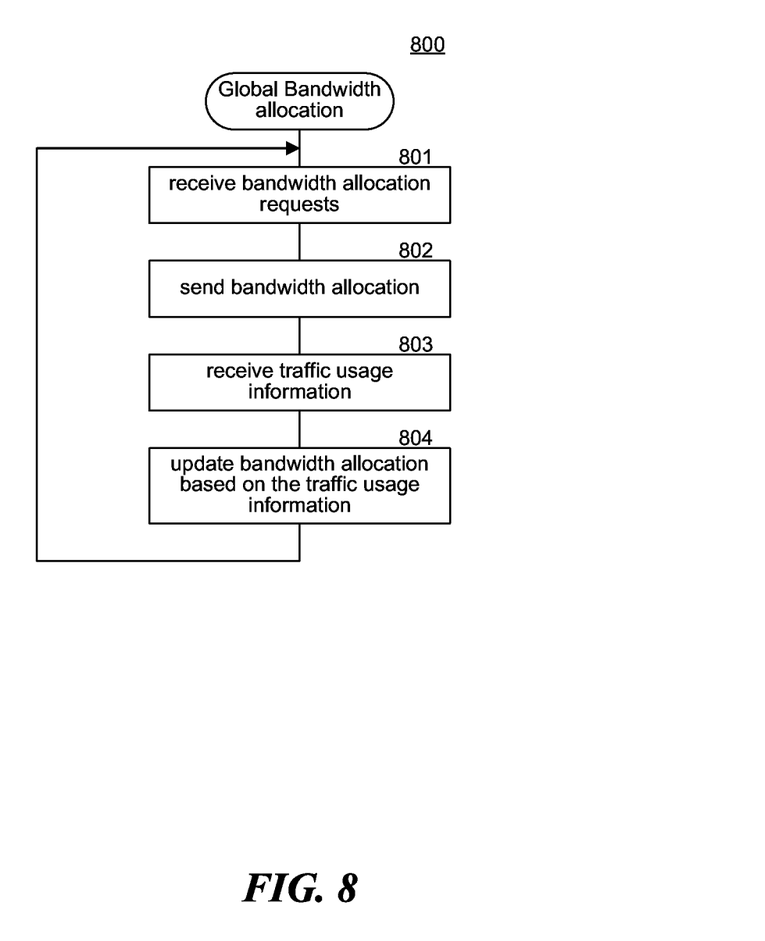
FIG. 8 is a flow diagram of a process for allocating bandwidth to different type of copy jobs by a global traffic manager node in some embodiments.

FIG. 8 is a flow diagram of a process 800 for allocating bandwidth to different type of copy jobs by a global traffic manager node in some embodiments. In some embodiments, the process 800 is executed in the environment 100 of FIG. 1. A global traffic manager node, e.g., the global traffic manager node 113, determines the allocation of bandwidth to different type of copy jobs and distributes the allocations to the source nodes. In block 801, the global traffic manager node 113 receives bandwidth allocation requests from one or more source nodes. In block 802, the global traffic manager node 113 sends the bandwidth allocation to different types of copy jobs to each of the source nodes. As described above, some example types of data being copied include—"imports", "namespace moves," and "scribe" data. Different types of data can have different priorities, e.g., the SLA for each type of data can be different. For example, a SLA for a first type of data may indicate that a copy job is assured a certain percentage of the bandwidth of the network, such as 10% of the bandwidth. Another bandwidth rule may indicate that a copy job is assured a certain data transmission rate (e.g., 4 gigabytes per minute). Still another bandwidth rule may indicate that a copy job is not assured any bandwidth (e.g., for a very low priority copy job). The SLA can be input a user, e.g., administrator. In some embodiments, the administrator can also set additional bandwidth rules for allocating bandwidth to different types of copy jobs. The global traffic manager node 113 can allocate the bandwidth to different types of copy jobs based on the SLA and bandwidth rules set by the user (if any).

In block 803, the global traffic manager node 113 receives traffic usage information each of the source nodes. For example, the traffic usage information can include actual bandwidth usage information by each copy job at a particular source node, a type of the copy job, e.g., the type of the data being copied, a list of registrations at the particular source node.

In block 804, the global traffic manager node 113 updates the bandwidth allocation to different types of copy jobs based on the traffic usage information, and the process continues to block 801. After the source nodes receive the bandwidth allocation for different job types, each of the source nodes can then, based on the received bandwidth allocation, allocate portions of the allocated bandwidth to different copy jobs executing at the corresponding source node.

Figure 9:
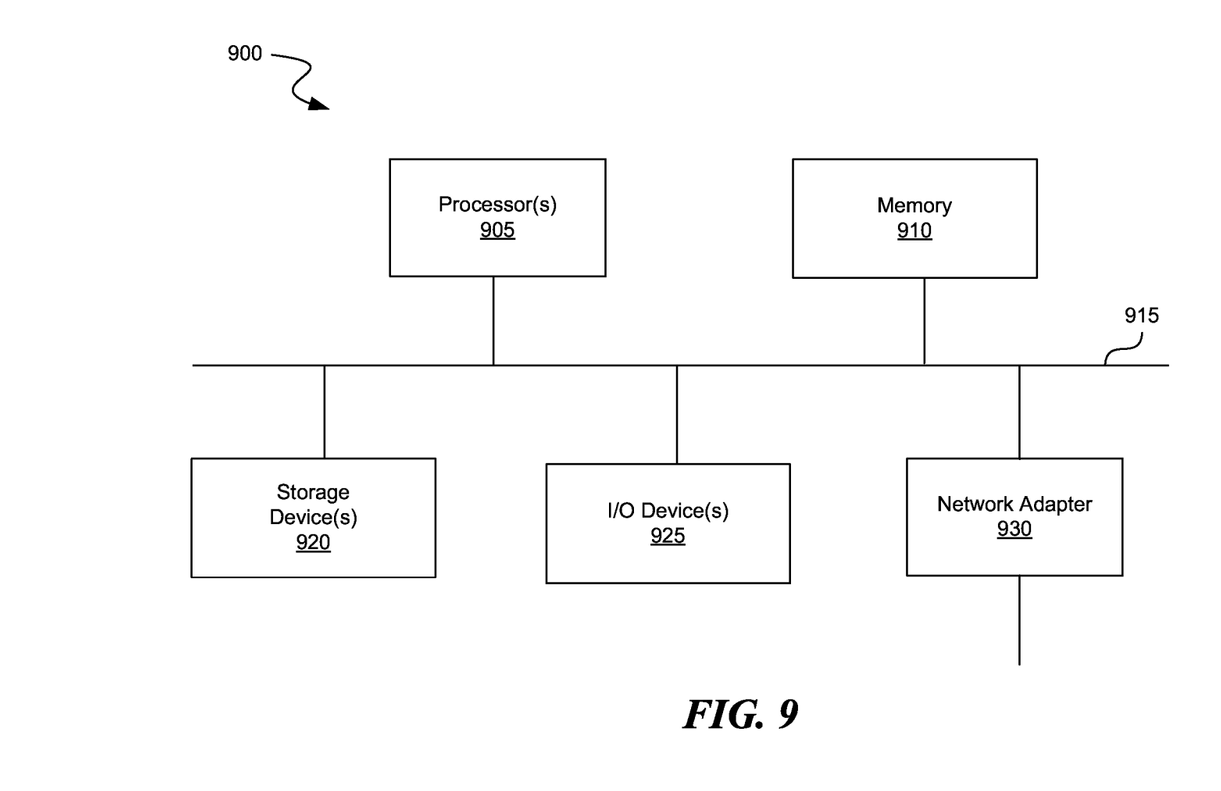
FIG. 9 is a block diagram of a computer system as may be used to implement features of the disclosed embodiments.

FIG. 9 is a block diagram of a computer system as may be used to implement features of the disclosed embodiments. The computing system 900 may be used to implement any of the entities, components or services depicted in the examples of the foregoing figures (and any other components and/or modules described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The invention claimed is:

1. A computer-implemented method for sharing network bandwidth in a data center comprising a plurality of node devices, performed by a source device comprising at least one processor, the method comprising:
receiving, from a global traffic manager device at the source device, bandwidth allocation for multiple types of copy jobs executing in a distributed computing system for moving data between multiple source devices and multiple destination devices;
upon receiving, at the source device and from a worker device, a registration of a copy job for copying data from the source device to a destination device, allocating bandwidth of the source device among copy jobs that are registered in accordance with a type of each of the copy jobs and the bandwidth allocation received from the global traffic manager device for each of the types of the copy jobs; and
executing, by the worker device, the copy job at the source device to copy the data in accordance with bandwidth allocated to the copy job to the worker device for forwarding to the destination device wherein as copy jobs are registered and deregistered the network bandwidth is reallocated among the copy jobs.

2. The method of claim 1, wherein receiving the registration includes:
assigning the copy job to a first executor thread of multiple executor threads of the worker device, and
receiving the registration from the first executor thread.

3. The method of claim 2, wherein the registration of a copy job specifies an Internet Protocol (IP) address and a port associated with the executor thread.

4. The method of claim 1, wherein receiving the registration includes receiving the registrations from multiple worker devices for different copy jobs.

5. The method of claim 1, wherein the method is performed by each of the multiple source devices of the data center.

6. The method of claim 1, wherein the source device is a data device of a Hadoop Distributed File System.

7. The method of claim 1, wherein receiving the registration includes:
assigning the copy job to the worker device that is part of the same data center as the source device.

8. The method of claim 1, wherein receiving the registration includes:
assigning the copy job to the worker device that is part of the same data center as the destination device.

9. The method of claim 1, wherein receiving the registration includes:
assigning the copy job to the worker device that is part of a data center different from that of the source device and the destination device.

10. The method of claim 1, wherein receiving the registration includes: assigning the copy job to multiple executors of the worker device, wherein
each executor of the multiple executors performs a portion of the copy job.

11. The method of claim 10, wherein the multiple executors include a first executor that copies a first block of a data file from the source device to the destination device and a second executor that copies a second block of the data file from the source device to the destination device.

12. A data center comprising:
multiple worker devices for copying data from source devices in one data center to destination devices in another data center, each worker device having multiple executor threads, wherein each executor thread is assigned an entire copy job or a portion of the copy job, each copy job specifying a source device a destination device, and data to be copied, each executor thread adapted to register its copy job with the source device before starting the copying of data and deregister its copy job from the source device after completing the copying of data;
multiple data devices, some of the multiple data devices being source devices of copy jobs and some of the multiple data devices being destination devices of copy jobs, wherein a source device is adapted to:
receive copy jobs and bandwidth allocation for different types of copy jobs;
upon receiving a registration or deregistration of a copy job from an executor thread, allocate bandwidth of the source device among the copy jobs that are registered at the source device in accordance with a type of each of the copy jobs and the bandwidth allocation received for each of the types of the copy jobs; and
send data in accordance with the bandwidth allocated to the copy job to the executor thread of the copy job for forwarding to the destination device of the copy job;
a global traffic manager device for distributing the bandwidth allocation for different types of the copy jobs to each of the source devices; and
at least one processor configured to execute the worker devices, the data devices, and the global traffic manager device.

13. The data center of claim 12 wherein the global traffic manager allocates bandwidth to different types of copy jobs based on different bandwidth rules.

14. The data center of claim 13, wherein a bandwidth rule indicates that a first type of copy job is assured a certain percentage of the network bandwidth.

15. The data center of claim 13, wherein a bandwidth rule indicates that a copy job is assured a certain data transmission rate.

16. The data center of claim 12, wherein the source device is configured to receive different registrations from executor threads of different worker devices.

17. The data center of claim 12, wherein the data devices are configured to work as worker devices by executing a worker device process at the data devices.

18. A non-transitory computer-readable storage medium for storing computer-executable instructions for controlling a source device for sharing of network bandwidth in a data center comprising a plurality of node devices, the computer-executable instructions comprising instructions adapted to:
receive bandwidth allocation for different types of copy jobs executing in a distributed computing system to copy data between multiple source devices and multiple destination devices, each copy job specifying a source device, a destination device, and data to copy;
receive registrations and deregistrations of copy jobs from executor threads executing on worker devices, each executor thread being assigned a copy job; and
upon receiving a registration of a copy job,
reallocate bandwidth of the source device among copy jobs registered at the source device factoring a type of each of the copy jobs registered at the source device and the bandwidth allocation provided by a global traffic manager device for different types of copy jobs;

send data to be copied by the copy job to the executor thread of the copy job; and upon receiving a deregistration of a copy job, reallocate bandwidth of the source device among remaining of the copy jobs registered at the source device.

19. The non-transitory computer-readable storage medium of claim 18, wherein receiving the registrations includes storing, for a first registration of the registrations, an IP address and a port number of a first executor thread of the executor threads from which the first registration is received.

20. The non-transitory computer-readable storage medium of claim 18, wherein receiving the deregistrations includes removing from the source device, for a first deregistration of the deregistrations, an IP address and a port number of a first executor thread of the executor threads from which the first deregistration is received.

* * * * *

UNITED STATES PATENT AND TRADEMARK OFFICE
CERTIFICATE OF CORRECTION

PATENT NO. : 10,164,904 B2
APPLICATION NO. : 15/146371
DATED : December 25, 2018
INVENTOR(S) : Jian Li Page 1 of 1

It is certified that error appears in the above-identified patent and that said Letters Patent is hereby corrected as shown below:

In the Claims

In Column 11, Line 26, Claim 1, delete "device wherein" and insert -- device, wherein --, therefor.

In Column 11, Line 65, Claim 11, delete "device and" and insert -- device, and --, therefor.

In Column 12, Line 7, Claim 12, delete "device a" and insert -- device, a --, therefor.

Signed and Sealed this
Nineteenth Day of February, 2019

Andrei Iancu
*Director of the United States Patent and Trademark Office*